UNITED STATES PATENT OFFICE.

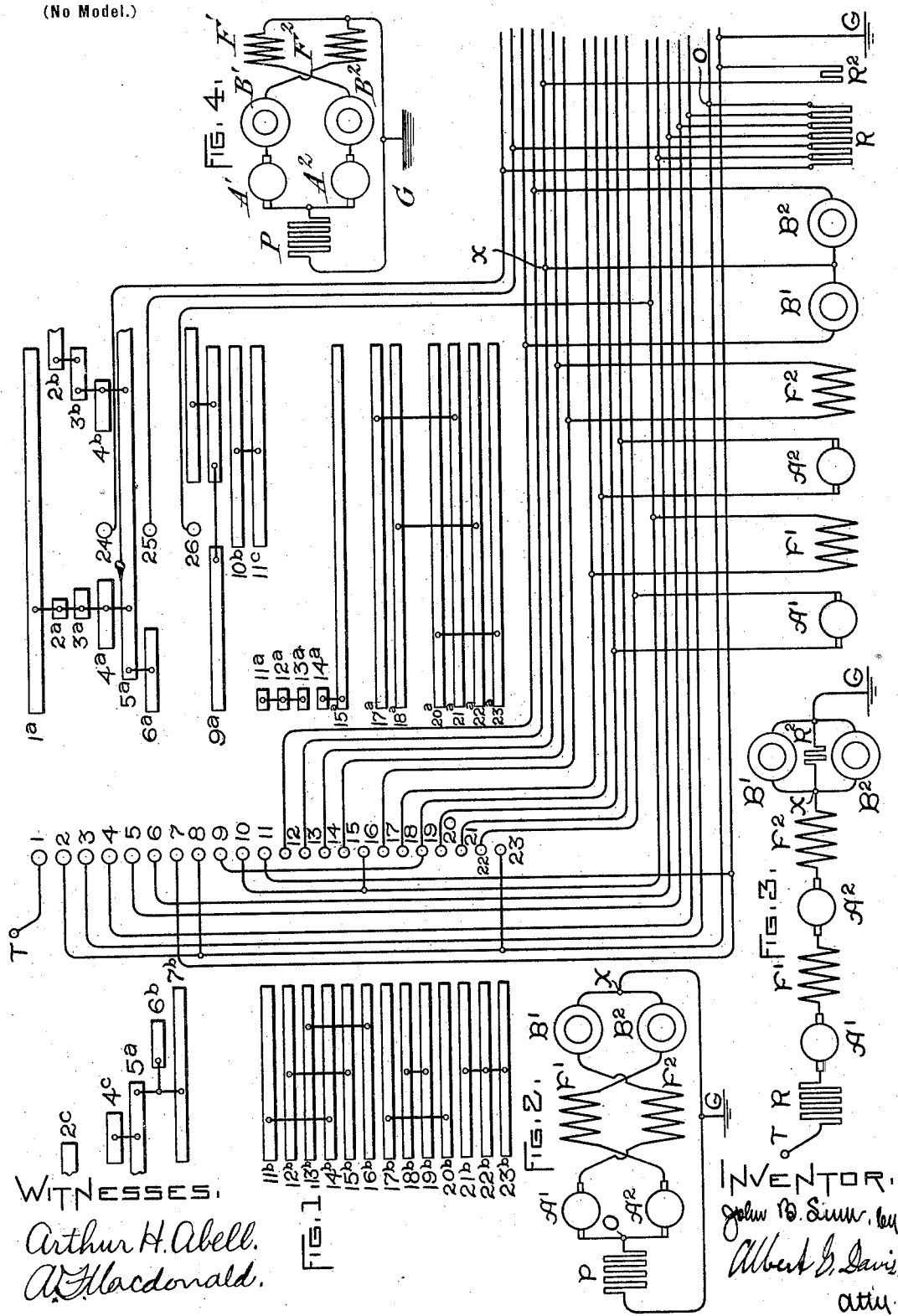

JOHN B. LINN, OF SCHENECTADY, NEW YORK, ASSIGNOR TO THE GENERAL ELECTRIC COMPANY, OF NEW YORK.

ELECTRIC BRAKE.

SPECIFICATION forming part of Letters Patent No. 610,908, dated September 20, 1898.

Application filed January 7, 1898. Serial No. 665,932. (No model.)

*To all whom it may concern:*

Be it known that I, JOHN B. LINN, a citizen of the United States, residing at Schenectady, in the county of Schenectady, State of New York, have invented certain new and useful Improvements in Electric Brakes, (Case No. 646,) of which the following is a specification.

My invention relates to electric braking apparatus, and has for its object to provide a system of connections which will obviate to some extent one of the difficulties attendant upon the operation of these devices—that is, the slipping of the wheels which sometimes occurs when the brake is applied with too much force. This I do by connecting the armature of each motor to the field of the other in a two-motor equipment, or in equipments where more than that number of motors is used the same system of connections could of course be applied by connecting the field of each motor to the armature of some other motor. By this arrangement when the brake-shoe upon any axle checks the rotation of the latter too much the motor upon the sticking axle ceases to generate current and the field of the other motor is killed, the shoe is released, and the axles begin again to revolve.

The invention also comprises a controlling device having contacts and connections to effect this object. It is manifest that this may be greatly varied and that it is impossible to so describe the contacts and system of wiring as to include all the variations. The broadest aspect of my invention therefore includes an electric braking apparatus in which the field of one motor is connected to the armature of another, the brake-shoes upon the same axle as the respective armatures being still kept in circuit with them.

The accompanying drawings show my invention applied to a controller, Figure 1 being a development of a controlling device for operating motors both as motors and as generators, with my invention applied thereto. Fig. 2 shows the first brake combination; Fig. 3, the first position of the motors when driving the car. Fig. 4 is a modification.

The connections will be traced only so far as is necessary for the comprehension of my invention.

The combination shown in Fig. 3 may be traced as follows: The current enters from the trolley to contact 1, thence by the various cross connections to contact $6^a$, then to the brush 6, to the resistance R, to the brush 23, contact $23^a$, by cross connection to contact $20^a$, to brush 20, through the armature A', to brush 22, thence to brush 18, through the field F', thence passing to the right to the contact 26, by the cross connections to contact $9^a$, to the brush 9, thence to brush 19, through the armature $A^2$, contact 21, to contact 17, through the field $F^2$, contact 15, and thence to contact 14, to the common terminal X of the brake-shoes. At this point the current divides, going through the shunting-resistance $R^2$ to ground and passing also in multiple through the brake-shoes B' $B^2$ to the contacts 12 and 13, respectively, which are connected with the contact 11, and thus to the ground-wire.

The object of the resistance $R^2$ is to momentarily pass the trolley-current or a small portion of it through the brake-shoes to demagnetize them and cause their immediate release when the motor-current is turned on. This, however, is not of my invention. The other steps of the controller on the motor side first cut out the resistance until the two motors are left in series, the brake-shoes and shunting-resistance being of course out of circuit. At the transition-point, where the contacts upon the right of the controller marked $10^b$ and $11^c$ come into circuit, the motors are thrown in multiple, one of them being first shunted to ground, this being a now well-known form of series-parallel controller, which also is not of my invention.

When, however, the controlling device is rotated in the other direction from the off position, (this being the position in which it is represented,) the contacts on the left of Fig. 1 are brought into operation, and here the combination of Fig. 2 is effected. This figure illustrates the essence of my invention, as in it the armature and brake-shoe upon one axle are connected to the field of the motor upon the other axle, for the reasons already pointed out. In tracing the connections it will be found simplest to start from the terminal O of the resistance. Here the path of the current is to the brush 23 and thence by the contacts 23$^b$, &c., to brushes 21 and 22. The path divides at this point, and the two armatures A' A$^2$ will be found to be in multiple. Passing from the brush 22, the circuit is through the armature A' to brush 20 and thence by the contacts 20$^b$ and 17$^b$ to brush 17, through the field F$^2$ of the second motor to the brush 15, by contacts 15$^b$ and 12$^b$ to the brush 12, thence through the brake-shoe B' to the common terminal X. Returning to the contact 21, the path is through the armature A$^2$ to brush 19, by contacts 19$^b$ and 18$^b$ to brush 18, thence through the field F' of the first motor to contact 16, and by 16$^b$ and 13$^b$ to brush 13, through the brake-shoe B$^2$ to the common terminal X, thence to the brush 14, and by 14$^b$ and 11$^b$ to the brush 11, to the ground-wire, thence to brush 7, and by the cross connections to the contact 5$^a$. This, it will be observed, is extended to the other side of the controller, and here the brush 24 touches the contact 4$^a$, which is connected to 5$^a$, and thus the circuit is completed to the other terminal of the resistance R, the resistance R$^2$ being thus short-circuited. Although the ground-wire is thus used and the ground-circuit is maintained, the latter plays no part in the connections, the ground-wire being used for convenience only.

I have shown in Fig. 4 that the brake-shoes may be as well connected between the armatures and fields as between the fields and the ground-wire. It is manifest that the operation of these connections would be substantially identical with those shown. I have not considered it necessary to show the particular changes in the controller, as they would be apparent to an engineer.

The operation, electrically, of the device indicated is as follows: If the armature A$^2$, for instance, should cease to rotate by the application of the shoe B$^2$ upon the same axle, the field F' of the motor A' would not only get no current from the armature A$^2$, but such current as would reach it from its own armature would be in a reverse direction—that is, if the armature A' should for a moment continue to generate, it would send current through the field F$^2$ of the other motor, through its own brake-shoe B', and in a reverse direction through the shoe B$^2$ and the field F' to the armature A$^2$, tending to drive the latter as a motor. The consequence is that the shoe B$_2$ would be demagnetized and released, the armature A' would have its field practically killed, and the shoe B' would release. As soon, however, as the shoe B$^2$ was also released both the armatures would be driven by the momentum of the car in the usual way, and the shoes would be at once again applied. In practice this effect is produced as the current alternates between the two motors, without the actual release of the different brake-shoes; but their attractive effect is slightly weakened, so that the sticking armature begins to revolve.

What I claim as new, and desire to secure by Letters Patent of the United States, is—

1. In an electric braking apparatus, the combination, with a number of dynamo-electric armatures and brake mechanisms upon common axles, of means for passing the current from one armature through the field of another of the dynamo-electric machines.

2. In an electric braking apparatus, the combination, with a number of dynamo-electric machines, each provided with a magnetic brake-shoe controlling the axle connected to its armature, of means for passing through the field of any given dynamo the current from the armature and brake-circuit of another axle.

3. In an electric braking apparatus, the combination, with dynamo-electric machines, each having a magnetic brake-shoe controlling the axle connected to its armature, of a controlling device provided with contacts and connections for regulating the dynamo-electric machines as motors from rest to full speed, and with braking-contacts for cross-connecting the field of one machine to the armature of another while still passing the same current through the brake-shoe of the armature so connected.

4. In an electric braking apparatus, the combination, with two dynamo-electric machines having magnetic brake-shoes controlling the axles to which the respective armatures are connected, of a controller having contacts and connections for regulating the speed and torque of the dynamos as motors, and having also contacts and connections for connecting the field of each dynamo when used as a braking-generator in circuit with the armature and brake-shoe of the other dynamo, as described, and for the purpose set forth.

In witness whereof I have hereunto set my hand this 5th day of January, 1898.

JOHN B. LINN.

Witnesses:
B. B. HULL,
M. H. EMERSON.